(No Model.)
J. H. GOLLEHON, G. G. BRITTON & J. F. LUCAS.
PLAITING APPARATUS.
No. 316,355. Patented Apr. 21, 1885.
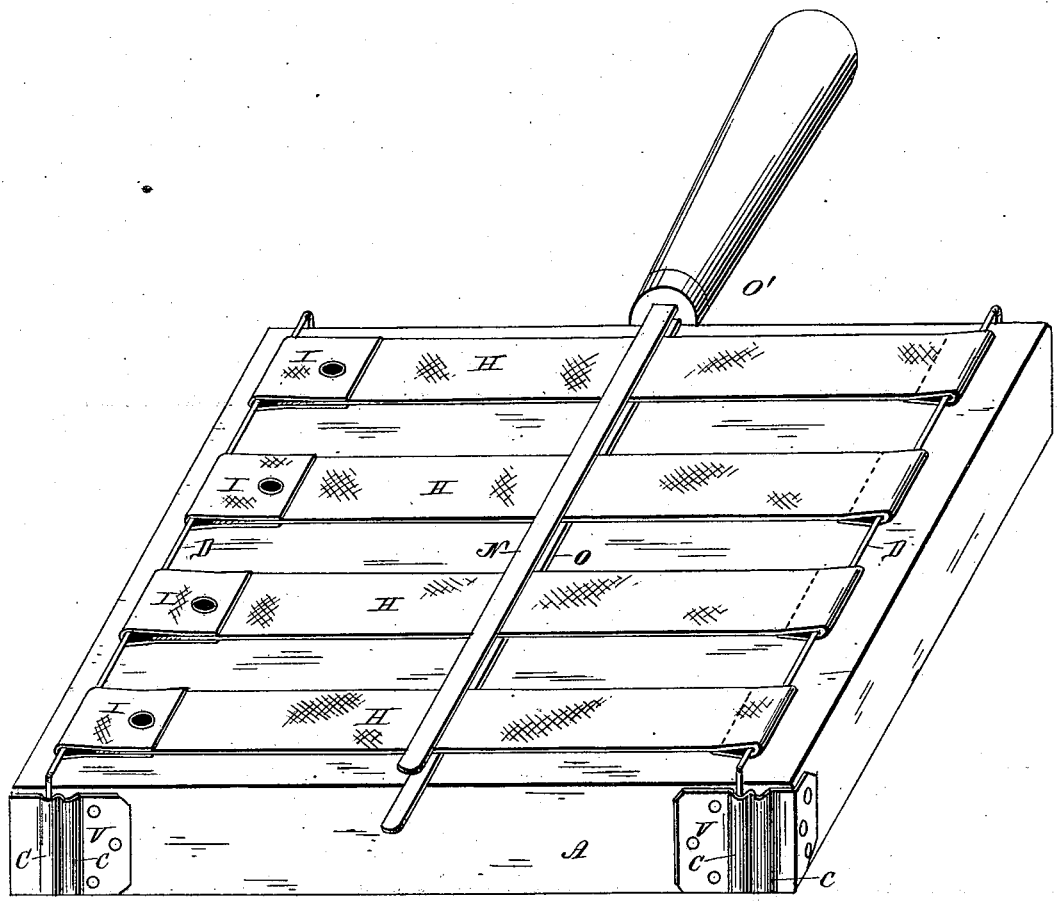

United States Patent Office.

JOSEPH H. GOLLEHON, GEORGE G. BRITTON, AND JOHN F. LUCAS, OF MARION, VIRGINIA.

PLAITING APPARATUS.

SPECIFICATION forming part of Letters Patent No. 316,355, dated April 21, 1885.

Application filed July 19, 1884. (No model.)

*To all whom it may concern:*

Be it known that we, JOSEPH H. GOLLEHON, GEO. G. BRITTON, and JOHN F. LUCAS, of Marion, in the county of Smyth and State of Virginia, have invented certain new and useful Improvements in Plaiting Apparatus; and we do hereby declare the following to be a full, clear, and exact description of the invention, such as will enable others skilled in the art to which it pertains to make and use it, reference being had to the accompanying drawing, which forms part of this specification.

Our invention relates to an improvement in plaiting apparatus; and it consists in the combination of a suitable board, across each end of which extends a suitable wire, a suitable number of strips which run lengthwise with the board, and which have their ends attached to the wires, suitable elastics which form one end of the strips, and holding devices for the ends of the wires, as will be more fully described hereinafter.

The object of our invention is to make the wires adjustable back and forth in relation to each other, and to provide each of the strips with a suitable elastic, so that the tension on the strips will be uniform, and thus avoid the necessity of cutting and resewing them.

The accompanying drawing represents a perspective of a plaiting-machine embodying our invention together with the knife which is used in connection therewith.

A represents a board of suitable length and width, which is preferably covered with cloth or any suitable material, and ornamented in any manner desired so as to make it attractive. At each corner of the board is fastened a holding device, V, in each one of which are formed a suitable number of creases or sockets, C, to receive the turned-down ends of the wires D. A wire, D, extends across each end of the board, and is held in position by having its turned-down ends catch in the sockets in the holding-pieces. By having a number of sockets the wires can be adjusted back and forth in relation to each other according to the width of the goods being operated upon. Fastened to these two wires are a suitable number of strips, H, of any suitable material, and which extend lengthwise of the board. One end of each of these strips is fastened directly to one wire, while the other ends are fastened to the elastics I, which elastics are fastened to the other wire. These elastics serve to give a uniform tension upon each of the strips, and thus prevent their becoming stretched and necessitating cutting the strips and resewing them to the wires. Each one of these strips is adjustable laterally upon its wire, and thus the strips can be brought in any desired relation to each other according to the width of the plaiting that may be desired. In connection with this plaiting-board a knife, O', having two blades or prongs, N O, is used. These prongs are made of tin, slightly separated from each other, and secured to a handle. This knife is used in forming the plaits.

Having thus described our invention, we claim—

1. The combination, in a plaiting apparatus, of the board, the holding device provided with a number of sockets, and the wires having turned-down ends, the wires being adjustable in relation to each other, substantially as shown.

2. In a plaiting apparatus, the combination of the board provided with holding devices which have a number of sockets, the wires having turned-down ends to catch in the sockets, the strips, and the elastics which are secured to the strips, substantially as set forth.

In testimony whereof we affix our signatures in presence of two witnesses.

JOSEPH H. GOLLEHON.
GEORGE G. BRITTON.
JNO. F. LUCAS.

Witnesses:
WILLIAM E. LEONARD,
P. F. RUSSELL.